(12) United States Patent
Hoffmeyer et al.

(10) Patent No.: US 11,774,327 B2
(45) Date of Patent: Oct. 3, 2023

(54) BIOINERT SAMPLING NEEDLE

(71) Applicant: DIONEX CORPORATION, Sunnyvale, CA (US)

(72) Inventors: Daniel Hoffmeyer, San Jose, CA (US); Licheng Tseng, San Jose, CA (US)

(73) Assignee: Dionex Corporation, Sunnyvale, CA (US)

( * ) Notice: Subject to any disclaimer, the term of this patent is extended or adjusted under 35 U.S.C. 154(b) by 312 days.

(21) Appl. No.: 17/137,179

(22) Filed: Dec. 29, 2020

(65) Prior Publication Data

US 2022/0205876 A1   Jun. 30, 2022

(51) Int. Cl.
*G01N 1/14* (2006.01)
*B01L 3/00* (2006.01)
*G01N 30/24* (2006.01)
*G01N 30/02* (2006.01)

(52) U.S. Cl.
CPC ............... *G01N 1/14* (2013.01); *B01L 3/561* (2013.01); *G01N 30/24* (2013.01); *B01L 2300/0672* (2013.01); *B01L 2300/123* (2013.01); *B01L 2300/16* (2013.01); *G01N 2001/1418* (2013.01); *G01N 2030/027* (2013.01)

(58) Field of Classification Search
CPC .. G01N 1/14; G01N 30/24; G01N 2001/1418; G01N 2030/027; G01N 35/1079; G01N 2030/167; B01L 3/561; B01L 2300/0672; B01L 2300/123; B01L 2300/16; B01L 3/021
USPC ........... 73/61.55, 23.35–23.42, 61.52–61.59, 73/64.56, 864.21–864.25, 864.73, 864.74, 73/864.81, 864.87; 422/70, 500, 501, 509
See application file for complete search history.

(56) References Cited

U.S. PATENT DOCUMENTS

| | | | |
|---|---|---|---|
| 7,175,812 B2 | 2/2007 | Tatsumi |
| 7,219,566 B1 | 5/2007 | Maeda |
| 7,337,654 B2 | 3/2008 | Tomita et al. |
| 8,313,476 B2 | 11/2012 | Thompson et al. |
| 8,739,610 B2 | 6/2014 | Yasunaga et al. |
| 9,134,335 B2 | 9/2015 | Dehmer et al. |
| 9,314,794 B2 | 4/2016 | Yamazaki et al. |

(Continued)

FOREIGN PATENT DOCUMENTS

| | | | |
|---|---|---|---|
| CN | 207036882 | * | 2/2018 |
| EP | 1795264 A1 | | 6/2007 |

(Continued)

OTHER PUBLICATIONS

EP21215873.7, Extended European Search Report, dated Aug. 8, 2022, 10 pages.

(Continued)

*Primary Examiner* — Robert R Raevis (57) ABSTRACT

A sampling needle is provided for piercing a septum of a vial containing a sample and aspirating the sample from the vial. The needle may include: a tubular core having a lumen extending therethrough and a piercing end, wherein the tubular core is formed of a bioinert material; a hollow support encircling the tubular core with the piercing end extending outwardly from the support, wherein the support is formed of a rigid material; and a bioinert coating covering a portion of the support adjacent the piercing end, wherein the tubular core and the covering isolates the support from the sample.

16 Claims, 5 Drawing Sheets

(56) References Cited

U.S. PATENT DOCUMENTS

| | | | |
|---|---|---|---|
| 2002/0102185 A1 | 8/2002 | Tatsumi | |
| 2005/0217393 A1 | 10/2005 | Tomita et al. | |
| 2008/0172023 A1 | 7/2008 | Thompson et al. | |
| 2012/0111127 A1* | 5/2012 | Maeda | G01N 35/1097 73/863.01 |
| 2015/0247830 A1 | 9/2015 | Dourdeville et al. | |

FOREIGN PATENT DOCUMENTS

| | | | | |
|---|---|---|---|---|
| EP | 2469261 A1 * | 6/2012 | | B01J 15/00 |
| WO | WO-2007146837 A2 * | 12/2007 | | G01N 30/24 |

OTHER PUBLICATIONS

EP21215873.7, Partial European Search Report, dated May 6, 2022, 11 pages.

\* cited by examiner

BIOINERT SAMPLING NEEDLE

BACKGROUND OF INVENTION

Field of Invention

This application relates to sampling needles for piercing a septum of a vial containing a sample and aspirating the sample from the vial.

Description of Related Art

In the fields of biochemistry and analytical chemistry, laboratory researchers generally prepare, manipulate, and analyze a multitude of samples for a variety of reasons. Many laboratories employ sophisticated, automated machines able to prepare or analyze hundreds of samples at a time.

Chromatography systems often utilize an autosampler having a gantry controlled by a user-defined program to analyze an array of samples. The needle arm forces the needle downward to pierce the septum or seal of a sample vial lid in the array. The needle is a key component of the autosampler as it is part of the liquid flow path and therefore is not only exposed to high pressure but also to any possible customer samples and system liquids. The gantry drives the needle into and out of sample vials, and it drives the needle into and out of engagement with various ports with sufficient force to pierce septa and engage ports creating leak-free connections. Accordingly, the needle must be durable enough to repeatedly pierce sample seals and seal with injection ports without degradation or deformation.

Many metals, including stainless steel, are often undesirable for sampling needles because sampling needles have a "wetted" component, which is any portion of the needle that directly contacts the sample material. And reactive metals may cause unwanted leaching and interference with the sample. In high-performance liquid chromatography (HPLC) and ion chromatography (IC) applications, metal can become corroded and/or interact with the sample or system components thereby diminishing system performance. Therefore, many inert materials do not corrode but are generally too soft to repeatedly pierce septa thousands of times, and thus many inert materials are not ideal for constructing sampling needles. For example, under certain circumstances, needles made of polyetheretherketone (PEEK) cannot be used for HPLC and keep its geometric shape.

Considering the above, it would be beneficial to have sampling needles that overcome the above and other disadvantages.

BRIEF SUMMARY

One aspect of the present invention is directed to a sampling needle for piercing a septum of a vial containing a sample and aspirating the sample from the vial. The needle may include: a tubular core having a lumen extending therethrough and a piercing end, wherein the tubular core is formed of a bioinert material; a hollow support encircling the tubular core and the piercing end extending outwardly from the support, wherein the support is formed of a rigid material; and a bioinert coating covering a portion of the support adjacent the piercing end. The tubular core and the bioinert coating may isolate the support from contacting the sample.

The sampling needle may include one or more of the following features.

The bioinert material may include a noble metal.

The bioinert material may be a platinum alloy.

The platinum alloy may include iridium.

The platinum alloy may include 10% iridium.

The piercing end may be polished to an average surface roughness (Ra) of 0.1 µm.

The piercing end of the tubular core may include a passageway connected to the lumen, wherein the lumen has a first cross-sectional area and the passageway has a second cross-sectional area that may be smaller than the first cross-sectional area, whereby the passageway is a stop junction that may prevent inadvertent leakage from the sampling needle.

The support may be stainless steel.

The support may be a nickel cobalt stainless steel alloy (e.g., MP-35N).

The support may include a tapered end adjacent the piercing end of the tubular core, and the tapered end may be polished to an average surface roughness (Ra) of 0.1 µm.

The bioinert coating may be a diamond-like carbon (DLC) coating.

The DLC coating has a thickness of approximately 1-3 µm.

The support may include an outer wall, and the bioinert coating may cover a length of the outer wall adjacent the piercing end.

The length of the outer wall covered by the bioinert coating may be approximately one-half of an overall length of the support.

The needle may include a mounting end opposite the piercing end, wherein the support may include a circumferential recess adjacent the mounting end that may facilitate bending the needle adjacent the mounting end.

The needle may further include an enlarged annular shoulder at an end of the circumferential recess adjacent the mounting end, and the annular shoulder may be configured to engage an adaptor for fluidly sealing the needle to a sample loop of a chromatography system.

Another aspect of the present invention is directed to a chromatography system may include an autosampler for accessing an array of sample vials, an injection port, and a sampling needle. The sampling needle may include: a tubular core having a lumen extending therethrough and a piercing end, wherein the tubular core is formed of a bioinert material; a hollow support encircling the tubular core with the piercing end extending outwardly from the support, wherein the support is formed of a rigid material; and a bioinert coating covering a portion of the support adjacent the piercing end. The tubular core and the covering may isolate the support from the sample. The needle may be configured to pierce septa on the sample vials, aspirate samples from the vials, and transfer the samples to the injection port.

The chromatography system may include one or more of the following features.

The injection port may include a port collar having a bore, a tapered opening, and a radiused intersection between the bore and the tapered opening, and the piercing end may include a conical end. The sampling needle and the injection port may be configured to seal when the conical end of the sampling needle engages the radiused intersection of the port collar.

The injection port may further include a port base, and the port collar may be received within a cylindrical receptacle of the port base. The port collar may be formed of polyetheretherketone (PEEK) and the port base may be formed of metal.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention(s) as defined by the appended claims.

Figure 1:
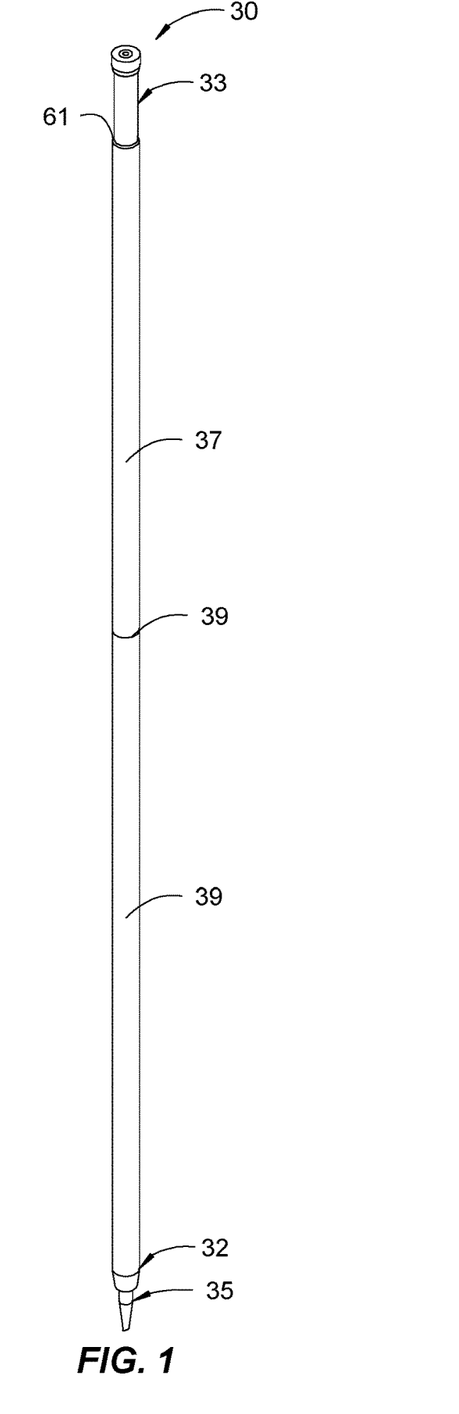
FIG. 1 is a perspective view of an exemplary sampling needle in accordance with various aspects of the present invention.

Turning now to the drawings, wherein like components are designated by like reference numerals throughout the various figures, attention is directed to FIG. 1 which shows an exemplary bioinert sampling needle 30 that is particularly well suited for use in autosamplers of chromatography systems and other analytical equipment. For example, the needle is designed to interface with a robotic manipulator or gantry of an autosampler, which gantry positions the needle to aspirate and dispense precise amounts of liquid from sample vials. The construction of needle 30 allows for repeatedly puncturing septa and creating no-leak interfaces with various fluid ports of analytical equipment. The liquid flow path of the needle and all its surfaces in contact with liquid are inert thus promoting compatibility of the needle with high performance liquid chromatography (HPLC) systems and even with the corrosive eluents of ion chromatography (IC) systems. An inert or bioinert material does not interact or have a chemical reaction with the sample or eluent that is sufficient to cause an interference in the chromatographic analysis.

Needle 30 has a piercing end 32 designed to pierce the septum or seal of a sample vial lid and a mounting end 33 designed to support the sampling needle in the gantry of an autosampler thus allowing the needle to be precisely moved within the autosampler in order to aspirate samples from an array of sample vials. The sampling needle generally includes a dual-layer structure having a tubular bioinert core 35 and a hollow metal shell or support 37 surrounding the tubular core providing structural integrity to the sampling needle. The needle also includes a bioinert coating 39 covering the metal support adjacent the piercing end to isolate the metal support from sample in the sample vial. In addition, bioinert coating 39 may cover a portion or all of the outer surface of tubular core 35 at the piercing end 32.

Figure 3:
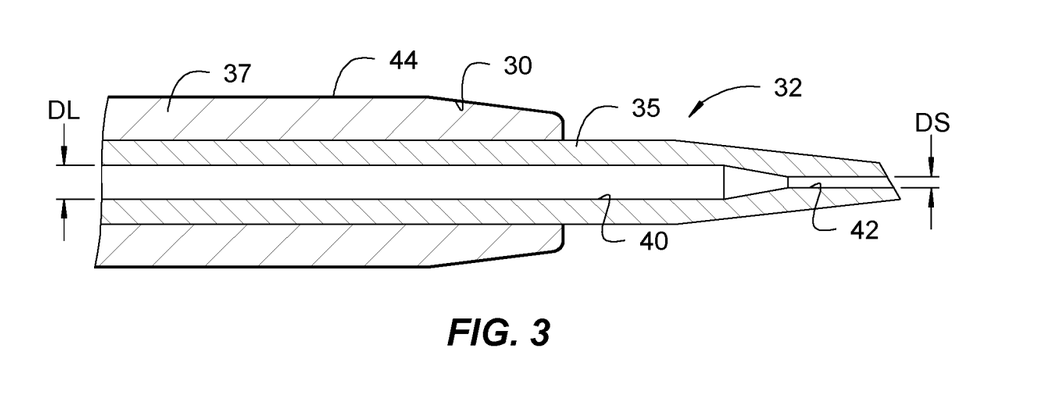
FIG. 3 is a cross-sectional view of a piercing end of the sampling needle of FIG. 1.
Figure 4:
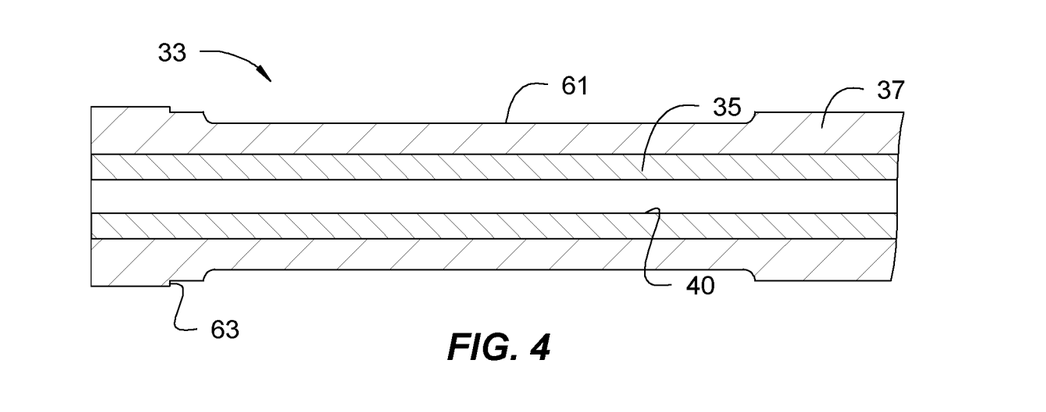
FIG. 4 is a cross-sectional view of the mounting end of the sampling needle of FIG. 1.

With reference to FIG. 3 and FIG. 4, tubular core 35 includes a lumen 40 extending therethrough extending from mounting end 33 through piercing end 32 providing a flow path for sample aspirated from a sample vial and then delivered to an injection port of a chromatography system. The tubular core is formed of a bioinert material to limit reactivity with the sample and/or potentially corrosive eluents.

Hollow support 37 surrounds tubular core 35 and provides overall structural integrity to the needle. The support may include any metal with the structural properties and tensile strength to resist bending and other deformation of the needle when mounted in an autosampler. Since the tubular core provides an inert flow path that is isolated from the support, the support may be formed of less-expensive rigid materials that provide overall structural integrity to the needle. The rigid material should be sufficiently rigid so as to prevent the needle from bending or deforming during the operation of mating with a needle seat under a force. For example, the needle should bend less than 5 degrees, preferably less than 3 degrees, and more preferably less than 1 degree with respect to a longitudinal axis of the needle. Various metals for support 37 include, but are not limited to, stainless steels and other suitable materials may be used. For example, MP-35N is particularly well suited for the support as it is a nickel cobalt stainless steel alloy with high tensile strength and great corrosion resistance.

With reference to FIG. 3, hollow support 37 encircles tubular core 35 with piercing end 32 extending outwardly from the support. While support 37 provides the main structural integrity of the needle, the bioinert material should have sufficient structural to minimize deformation of piercing end 32 of tubular core 35 that protrudes beyond support 37. As an example, support 37 may have an outer diameter of about 1.5 mm and an inner diameter of about 0.75 mm. Support 37 may have about a 15 degree tapered portion at the piercing end.

Suitable bioinert materials for the tubular core include, but are not limited to, noble metals such as ruthenium (Ru), rhodium (Rh), palladium (Pd), silver (Ag), osmium (Os), iridium (Ir), platinum (Pt), and gold (Ag), and alloys thereof. Platinum alloys are well suited for the tubular core, and platinum alloys including iridium are particularly well suited to provide the tubular core with sufficient strength. Preferably the platinum alloy includes iridium, and more preferably it includes at least approximately 10% iridium to provide beneficial strength and minimize or prevent deformation, which in turn promotes both fluid-tight engagement of piercing end 32 with injection ports and high wear resistance in repeatedly piercing sample vial septa. As an example, tubular core may have an outer diameter of about 0.75 mm and a tapered portion at the end to form a sharper piercing point.

Such a dual-layer configuration significantly reduces the cost of the needle. For example, platinum/iridium alloys are generally very expensive, while MP-35N and other stainless steels are relatively far less expensive. Using less-expensive stainless steels to provide overall structural integrity to the needle allows for minimal use of very-expensive noble metal alloys to provide an inert flow path and piercing end of the needle.

In addition, the piercing end may be polished to further promote fluid-tight engagement with injection ports. For example, the piercing end without any coating may be polished to an average surface roughness (Ra) in the range of 0.1 µm to 0.5 µm, and more preferably to an average surface roughness (Ra) of 0.1 µm.

With reference to FIG. 3, piercing end 32 of tubular core 35 may include a constricted passageway 42 fluidly connected to lumen 40 to provide a stop junction that prevents inadvertent leakage from needle 30. For example, the lumen may have a first cross-sectional area (e.g., with a larger diameter DL) and the passageway may have a second cross-sectional area (e.g., with a smaller diameter DS) that is smaller than the first cross-sectional area. Such a smaller cross-sectional area may promote increased pressure, lower flow rate and/or increased fluid surface tension thereby minimizing and/or preventing undesirable leakage from the needle. The DS may be approximately 25% to 50% less than the DL and/or the DS may be on the order of approximately 0.1 mm for adequately preventing such leakage.

With continued reference to FIG. 3, piercing end 32 may be slanted or beveled to provide a sharp point that facilitates in piercing the septa or seal of a sample vial. Preferably, the bevel is approximately 30-45 degrees.

The outside of the needle may be covered with a specialized coating to prevent corrosion or contamination between the metal support and the sample. In particular, bioinert coating 39 is applied to an outer wall 44 of support 37 to prevent any cross-contamination when the needle pierces a sample vial. As shown in FIG. 3, coating 39 completely coats the outside surface of support 37 adjacent piercing end 32 of tubular core 35 such that the tubular core and coating completely isolate the support material from contacting any sample, eluants or contaminants.

Preferably, the bioinert coating is a diamond-like carbon (DLC) coating, such as, but not limited to those provided by Acree Technologies Incorporated of Concord, Calif. DLC is a class of amorphous carbon material that displays some of the typical properties of diamond, and DLC generally contains significant amounts of $sp^3$ hybridized carbon atoms. A DLC coating is particularly well-suited to isolate the needle's support because a DLC coating has high hardness, low friction, wear resistance, high biocompatibility, and chemical inertness.

Figure 2:
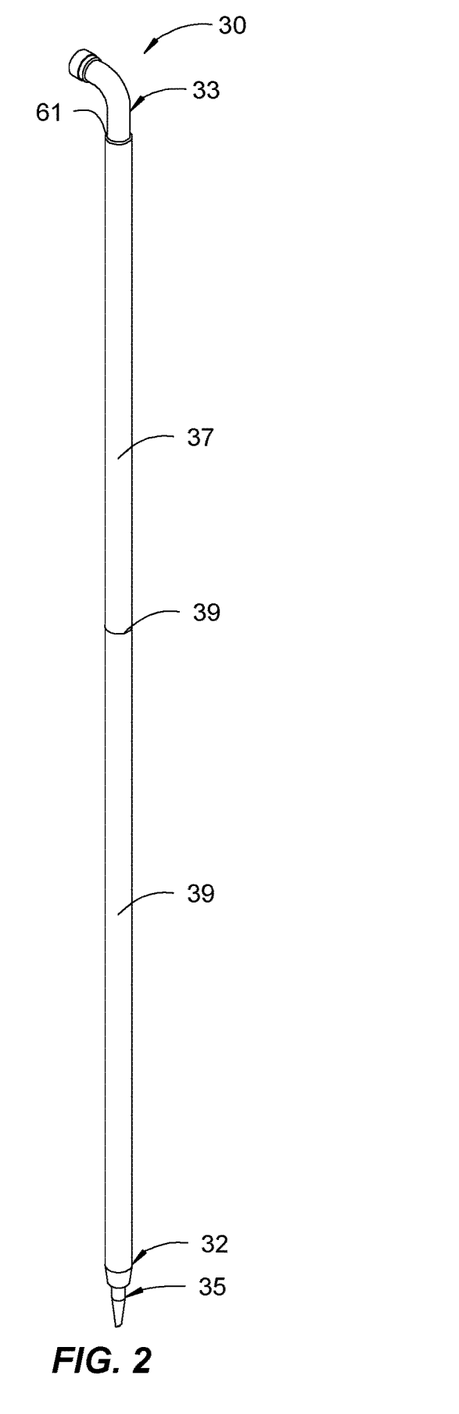
FIG. 2 is a perspective view of the sampling needle of FIG. 1 with a mounting end bent in accordance with various aspects of the present invention.

Preferably, the DLC coating completely coats the outside surface of the support in the area adjacent the piercing end. One will appreciate that the DLC coating need not cover the entire support, but should cover any area of the support at risk of contacting sample or eluents. As shown in FIG. 1 and FIG. 2, approximately one-half the overall length of support 37 may be covered with coating 39 to ensure that the support is sufficiently protected. And preferably, the DLC coating has a thickness of at least approximately 1-3 µm. Preferably, the coated areas of the needle have an average surface roughness (Ra) in the range of 0.1 µm to 0.5 µm, and more preferably to an average surface roughness (Ra) of 0.1 µm. Such minimal surface roughness is desirable to facilitate piercing of vials and to reduce wear of the coated needle.

Such a DLC coating may also advantageously reduce wear of the needle. It is common for pure metal needles to exhibit significant wear over 10,000 cycles, whereas a DLC may significantly reduce or prevent wear of a DLC-coated needle over similar usage.

Figure 7:
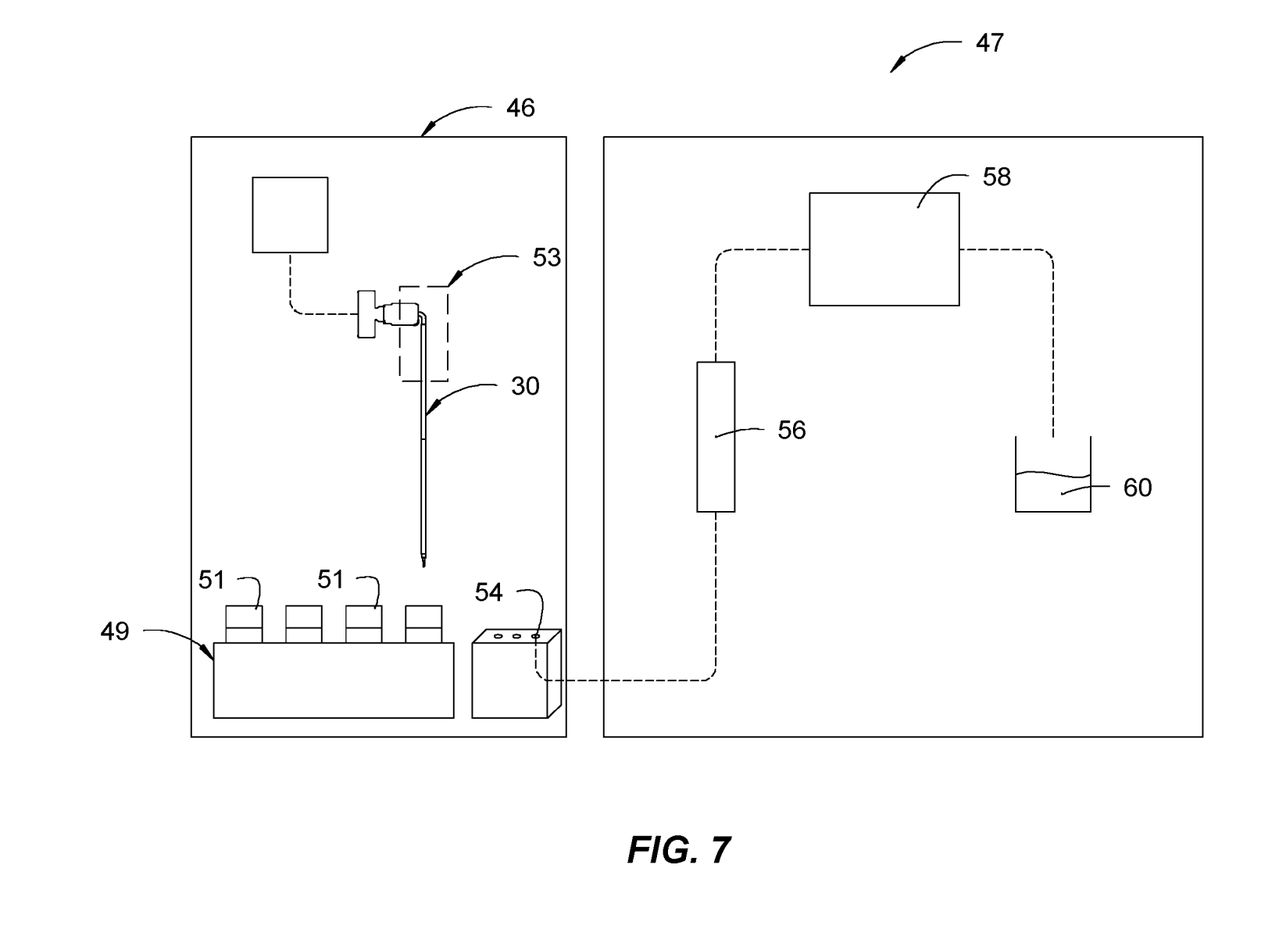
FIG. 7 is a schematic view showing the sampling needle of FIG. 2 mounted in an autosampler of a chromatography system in accordance with various aspects fo the present invention.

With reference to FIG. 7, needle 30 is particularly well suited for use in an autosampler 46 of a chromatography system 47, however one will appreciate that the needle may be used in other analytical equipment. Autosampler 46 may include an array 49 of sample vials 51 held on a carousel rack or tray, and a gantry 53 for moving needle 30 as needed to pierce into a select vial, aspirate sample from the vial, and deliver the aspirated sample. To this end, piercing end 32 of the needle is configured to engage with an injection port 54. The autosampler may also have other needle-receiving ports such as a flush port and/or a waste port. The injection port may be fluidly connected to a chromatography column 56, a detector 58, a waste reservoir 60 and/or other components of a chromatography system.

Figure 6:
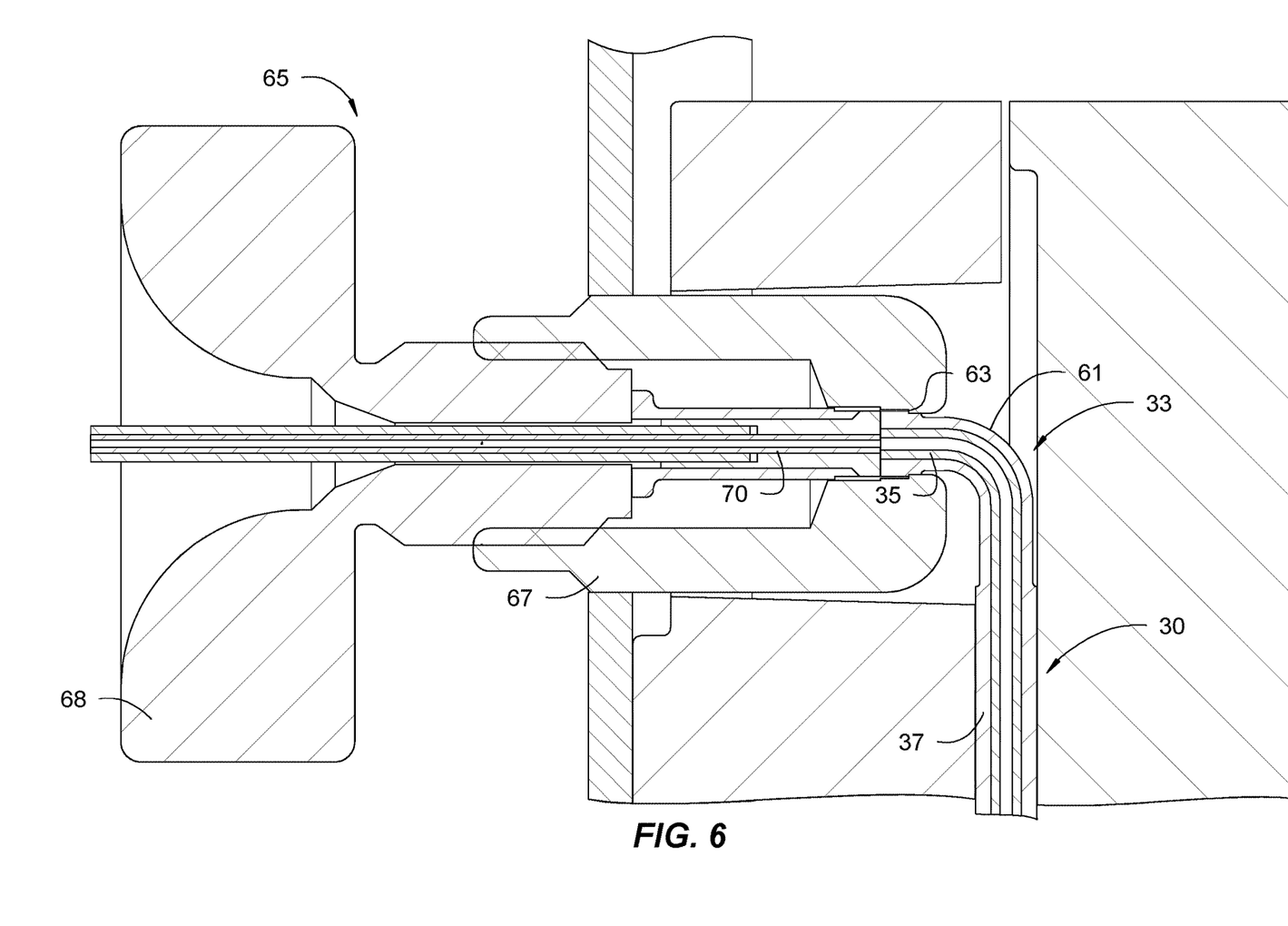
FIG. 6 is a cross-sectional view of the bent mounting end of FIG. 2 mounted in an autosampler gantry in accordance with various aspects of the present invention.

Mounting end 33 of needle 30 may be configured for secure and ready mounting to gantry 53. With reference to FIG. 2 and FIG. 6, the mounting end may be bent at a right angle, in which case, support 37 may have an annular recess 61 that facilitates bending without crimping or kinking, thus ensuring that lumen 40 remains unobstructed for use. Recess 61 is also shown in FIG. 1 and FIG. 3 prior to the optional bending of the needle.

As shown in FIG. 4, the mounting end may also include an annular shoulder 63 at one end of the recess. As shown in FIG. 6, the shoulder is dimensioned and configured to cooperate with a compression fitting 65 having a threaded collar 67 and knob 68. In particular, a complementary-shaped flange of the collar abuts against shoulder 63 and tightens the terminal end of tubular core 35 against a capillary 70 for fluid communication with a sample loop or other component.

Figure 5:
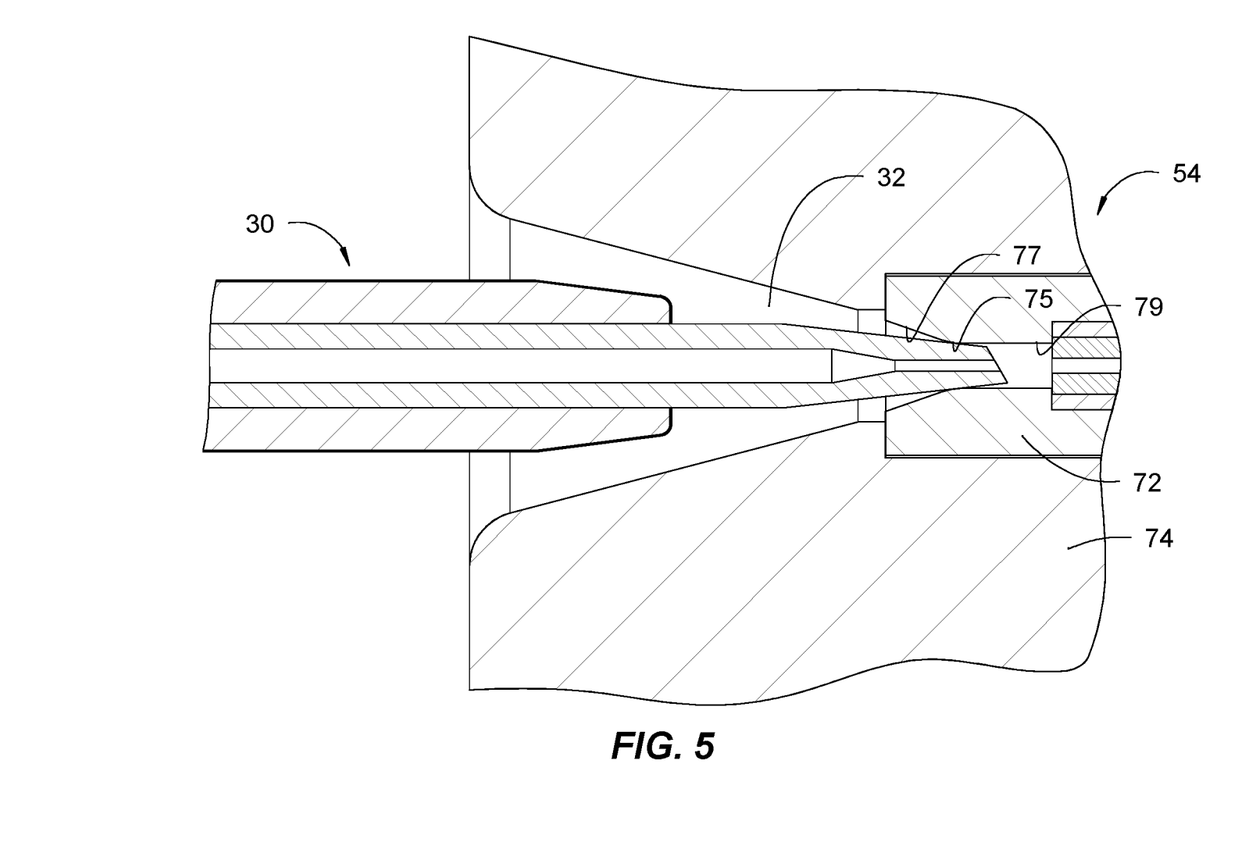
FIG. 5 is a cross-sectional view of the piercing end of FIG. 3 engaged with an injection port in accordance with various aspects of the present invention.

Piercing end 32 of needle 30 may be configured for engaging injection port 54 to form a fluid-tight seal. With reference to FIG. 5, the injection port may include a polyetheretherketone (PEEK) collar or receptacle 72 housed within a metal housing or port base 74. The PEEK receptacle allows for some deformation to create a better seal with piercing end 32, while the metal housing prevents the PEEK from deforming too much. This configuration, along with the geometry of the PEEK receptacle allows tightly abutting contact between the piercing end of the needle and the PEEK receptacle thereby promoting a repeatable fluid-tight seal with minimal degradation. The PEEK receptacle may include a radiused intersection 75 between a tapered opening 77 and a bore 79, whereby a conical surface of piercing end 32 engages the radiused intersection to form a fluid-tight seal that is capable of withstanding elevated pressures. In addition, the radiused intersection is configured to engage the piercing end behind its tip end thus avoiding unwanted wear and tear on the piercing end.

Advantageously, a sampling needle constructed in accordance with the above description was shown capable of soaking in 1M hydrochloric acid (HCL) for 30 days at 40° C. without visual discoloration of the needle or the liquid. And the needle was shown to withstand long-term performance testing including puncturing sample vial septum, sealing with an injection port, injecting over 10.000 cycles without visible degradation or deformation.

For convenience in explanation and accurate definition in the appended claims, relative terms such as "outside" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A sampling needle for piercing a septum of a vial containing a sample and aspirating the sample from the vial, the needle comprising:
    a tubular core having a lumen extending therethrough and a piercing end, wherein the tubular core is formed of a bioinert material;
    a hollow support encircling the tubular core, and the piercing end extending outwardly from the support, wherein the support is formed of a rigid material; and
    a bioinert coating covering a portion of the support adjacent the piercing end, the bioinert material include a noble metal;
    wherein the tubular core and the bioinert coating isolates the support from contacting the sample.

2. The sampling needle according to claim 1, wherein the bioinert material is a platinum alloy.

3. The sampling needle according to claim 2, wherein the platinum alloy includes iridium.

4. The sampling needle according to claim 3, wherein the platinum alloy includes 10% iridium.

5. The sampling needle according to claim 1, wherein the piercing end is polished to an average surface roughness (Ra) of 0.1 μm.

6. The sampling needle according to claim 1, wherein the piercing end of the tubular core includes a passageway connected to the lumen, wherein the lumen has a first cross-sectional area and the passageway has a second cross-sectional area that is smaller than the first cross-sectional area, whereby the passageway is a stop junction that prevents inadvertent leakage from the sampling needle.

7. The sampling needle according to claim 1, wherein the support is stainless steel.

8. The sampling needle according to claim 7, wherein the support is a nickel cobalt stainless steel alloy.

9. The sampling needle according to claim 1, wherein the support includes a tapered end adjacent the piercing end of the tubular core, and wherein the tapered end is polished to an average surface roughness (Ra) of 0.1 μm.

10. The sampling needle according to claim 1, wherein the bioinert coating is a diamond-like carbon (DLC) coating.

11. The sampling needle according to claim 10, wherein the DLC coating has a thickness of approximately 1-3 μm.

12. The sampling needle according to claim 1, wherein the support includes an outer wall, and the bioinert coating covers a length of the outer wall adjacent the piercing end.

13. The sampling needle according to claim 12, wherein the length of the outer wall covered by the bioinert coating is approximately one-half of an overall length of the support.

14. The sampling needle of claim 1, wherein the needle includes a mounting end opposite the piercing end, wherein the support includes a circumferential recess adjacent the mounting end configured to facilitate bending the needle adjacent the mounting end.

15. The sampling needle of claim 14, wherein the needle further includes an enlarged annular shoulder at an end of the circumferential recess adjacent the mounting end, wherein the annular shoulder is configured to engage an adaptor for fluidly sealing the needle to a sample loop of a chromatography system.

16. A chromatography system comprising:
    an autosampler for accessing an array of sample vials;
    an injection port; and
    a sampling needle including:
    a tubular core having a lumen extending therethrough and a piercing end, wherein the tubular core is formed of a bioinert material;
    a hollow support encircling the tubular core with the piercing end extending outwardly from the support, wherein the support is formed of a rigid material; and
    a bioinert coating covering a portion of the support adjacent the piercing end;
    wherein the tubular core and the covering isolate the support from the sample; and
    wherein the needle is configured to pierce septa on the sample vials, aspirate samples from the vials, and transfer the samples to the injection port,
    wherein the injection port comprises a port collar having a bore, a tapered opening, and a radiused intersection between the bore and the tapered opening, wherein the piercing end includes a conical end, wherein the sampling needle and the injection port are configured to seal when the conical end of the sampling needle engages the radiused intersection of the port collar,
    wherein the injection port further comprises a port base, wherein the port collar is received within a cylindrical receptacle of the port base, and wherein the port collar is formed of polyetheretherketone (PEEK) and the port base is formed of metal.

* * * * *